(12) United States Patent
Hirai et al.

(10) Patent No.: US 9,503,983 B2
(45) Date of Patent: Nov. 22, 2016

(54) WIRELESS COMMUNICATION SYSTEM, AND WIRELESS COMMUNICATION METHOD IN WIRELESS COMMUNICATION SYSTEM

(71) Applicant: PANASONIC INTELLECTUAL PROPERTY MANAGEMENT CO., LTD., Osaka (JP)

(72) Inventors: Katsuhiro Hirai, Fukuoka (JP); Etsuko Satoh, Fukuoka (JP); Shinji Fukuda, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/850,135

(22) Filed: Sep. 10, 2015

(65) Prior Publication Data

US 2016/0088561 A1    Mar. 24, 2016

(30) Foreign Application Priority Data

Sep. 19, 2014    (JP) .................................. 2014-190991

(51) Int. Cl.
*H04W 52/02*    (2009.01)
*H04M 11/02*    (2006.01)
*H04N 7/18*    (2006.01)

(52) U.S. Cl.
CPC ....... *H04W 52/0229* (2013.01); *H04M 11/025* (2013.01); *H04N 7/186* (2013.01); *H04W 52/0235* (2013.01)

(58) Field of Classification Search
CPC ............................................... H04W 52/0229
See application file for complete search history.

(56) References Cited

U.S. PATENT DOCUMENTS

2010/0141762 A1    6/2010 Siann et al.
2013/0136059 A1    5/2013 Matsuo et al.
(Continued)

FOREIGN PATENT DOCUMENTS

EP    1223680    7/2002
EP    1933507    6/2008
(Continued)

OTHER PUBLICATIONS

The Extended European Search Report dated Feb. 2, 2016 for the related European Patent Application No. 15184177.2.
(Continued)

*Primary Examiner* — Tuan H Nguyen
(74) *Attorney, Agent, or Firm* — Greenblum & Bernstein, P.L.C.

(57) ABSTRACT

A wireless communication system is a wireless communication system including a slave device, and a master device wirelessly connected to the slave device, and the master device includes a master device wireless communicator that performs wireless communication with the slave device, a master device power supply that supplies power to each unit of the master device, a master device interrupt detector that detects various interrupts, and a master device controller that controls the entire master device, the master device interrupt detector supplies power from the master device power supply to each unit of the master device when detecting the interrupt, and the master device controller performs control to continuously transmit a capture signal to the slave device that waits for reception at a reception timing of a predetermined interval, via the master device wireless communicator for time longer than the predetermined interval.

14 Claims, 12 Drawing Sheets

(56) References Cited

U.S. PATENT DOCUMENTS

2014/0104038 A1 4/2014 Hokazono et al.
2015/0142165 A1* 5/2015 Kao .................. G05B 19/4063
                                                              700/174

FOREIGN PATENT DOCUMENTS

| EP | 2882058 | 6/2015 |
|----|---------|--------|
| JP | 2003-087180 | 3/2003 |
| JP | 2006-061296 | 3/2006 |
| JP | 2014-082615 | 5/2014 |
| JP | 2014-143917 | 8/2014 |
| JP | 2014-154955 | 8/2014 |

OTHER PUBLICATIONS

U.S. Appl. No. 14/850,276 to Katsuhiro Hirai et al., filed Sep. 10, 2015.
U.S. Appl. No. 14/854,107 to Katsuhiro Hirai et al., filed Sep. 15, 2015.

* cited by examiner

WIRELESS COMMUNICATION SYSTEM, AND WIRELESS COMMUNICATION METHOD IN WIRELESS COMMUNICATION SYSTEM

BACKGROUND OF THE INVENTION

1. Field of the Invention

The present invention relates to a wireless communication system, and a wireless communication method in the wireless communication system.

2. Description of the Related Art

Awareness of crime prevention has improved year by year. In recent years, a demand for the realization of entrance monitors or the like through simple installation at a low cost even in single occupant households such as detached houses as well as studio apartments is increasing.

According to such a demand for the simple installation at a low cost, an entrance monitor in which a slave device of the entrance monitor or a master device of the entrance monitor is driven by a battery, and both of the devices are caused to perform wireless communication, making wiring work unnecessary, has begun to spread. In this case, since work for battery replacement occurs when the battery lifetime of the battery mounted on the slave device or the monitor master device expires, there is a need for a wireless communication system for reducing power consumption.

As a method of implementing reduction of power consumption of such a wireless communication system, a wireless communication technology in which a called station repeats regular reception, and a calling station continuously transmits a capture signal longer than an interval of the regular reception of the called station to transition to a constant operation, disclosed in, for example, Japanese Patent Unexamined Publication No. 2003-087180, is known.

Further, technology of a wireless master device (calling device) for suppressing useless continuous transmission when a call signal is continuously transmitted to an intermittently receiving wireless slave device (locator) so as to establish synchronization of transmission and reception, disclosed in, for example, Japanese Patent Unexamined Publication No 2014-082615, is known.

However, although the technology disclosed in Japanese Patent Unexamined Publication No. JP 2003-087180 can achieve a certain object of reducing power consumption of the called station (slave device), reduction of power consumption on the master side has not been considered. Further, the technology disclosed in Japanese Patent Unexamined Publication No. 2014-082615 is intended to reduce the power consumption for a transmission operation on the master side, in addition to reduction of the power consumption of the wireless slave device (locator), but reduction of power consumption of operations, including a reception operation, has not been considered.

SUMMARY OF THE INVENTION

The present invention has been made to solve the aforementioned problems of the related art, and a main object thereof is to provide a wireless communication system capable of greatly reducing power consumption of a wireless slave device and a wireless master device to satisfy the demand for simple installation at a low cost.

A wireless communication system of the present invention is a wireless communication system including a slave device, and a master device wirelessly connected to the slave device, in which the master device includes: a master device wireless communicator that performs wireless communication with the slave device; a master device power supply that supplies power to each unit of the master device; a master device interrupt detector that detects various interrupts; and a master device controller that controls the entire master device, the master device interrupt detector supplies power from the master device power supply to each unit of the master device when detecting the interrupt, and the master device controller performs control to continuously transmit a capture signal to the slave device that waits for reception at a reception timing of a predetermined interval, via the master device wireless communicator for time longer than the predetermined interval.

According to the present invention, it is possible to provide a wireless communication system capable of greatly reducing power consumption of a wireless slave device and a wireless master device through the configuration described above.

DETAILED DESCRIPTION OF THE PREFERRED EMBODIMENTS

Hereinafter, embodiments of the present invention will be described with reference to the drawings.

First Exemplary Embodiment

Figure 1:
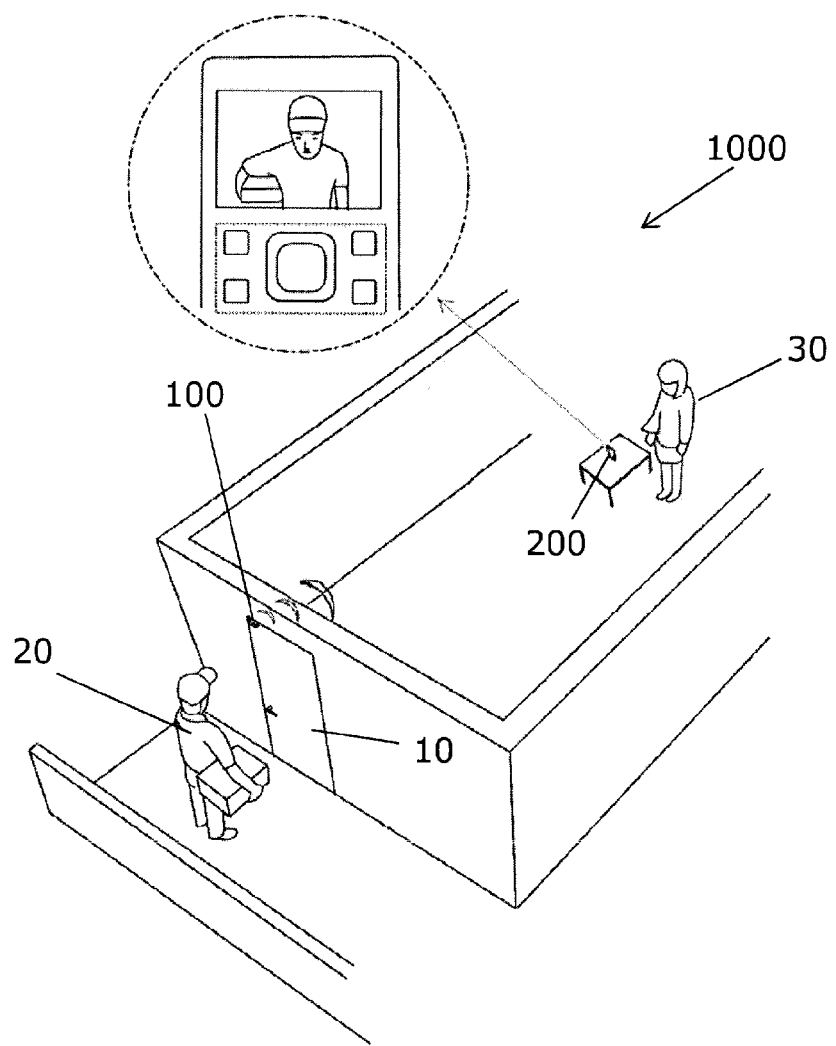
FIG. 1 is a schematic diagram illustrating an overview of a wireless communication system in a first exemplary embodiment.

FIG. 1 is a schematic view illustrating an overview of wireless communication system 1000 according to a first exemplary embodiment. Wireless communication system 1000 includes camera device 100, and monitor device 200. Camera device 100 and monitor device 200 communicate with each other via a wireless line.

Camera device 100 is arranged on the external (outdoor) side relative to entrance door 10 near entrance door 10 of a house, and installed to be hooked to an upper portion of entrance door 10. Camera device 100 images an outdoor space (for example, visitor 20, and the outdoor vicinity of entrance door 10).

Monitor device 200 is installed on the residential space (indoor) side relative to entrance door 10, and displays an image received from camera device 100 at a predetermined timing. The predetermined timing is, for example, a timing at which resident 30 hearing a chime sound or a knocking sound at entrance door 10 generated by visitor 20 operates monitor device 200 to confirm visitor 20.

Display by monitor device 200 is confirmed by resident 30. Monitor device 200 may be fixed in a predetermined indoor position (for example, an indoor wall) or may be suitably held and moved by indoor resident 30. FIG. 1 illustrates a case in which monitor device 200 is placed on an indoor table.

Figure 2:
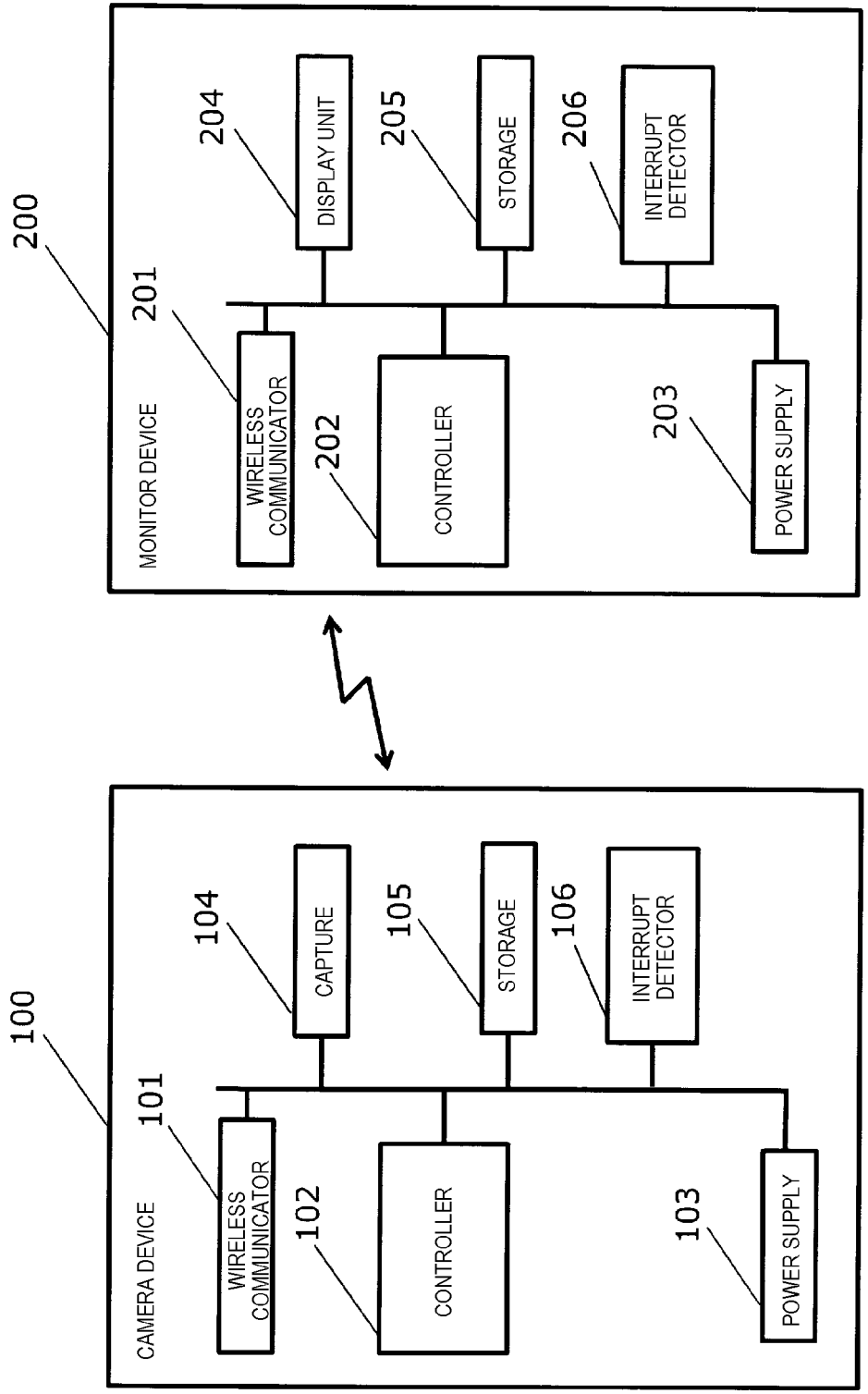
FIG. 2 is a block diagram illustrating an example of a configuration of the wireless communication system in the first exemplary embodiment.

FIG. 2 is a block diagram illustrating an example of a configuration of wireless communication system 1000 according to the first exemplary embodiment.

Configuration of the Camera Device

Camera device 100 includes wireless communicator 101, controller 102, power supply 103, capture 104, storage 105, and interrupt detector 106.

Wireless communicator 101 communicates with monitor device 200 over a wireless line. A communication scheme in wireless communicator 101 includes, for example, digital enhanced cordless telecommunication (DECT), a wireless local area network (LAN), or Zigbee (registered trademark).

Wireless communicator 101 transmits a captured image to monitor device 200. Accordingly, indoor resident 30 can visually recognize visitor 20 present in the vicinity of entrance door 10. Further, wireless communicator 101 receives voice of visitor 20 using a microphone (not illustrated) of camera device 100, and transmits audio information including the voice of visitor 20 to monitor device 200. Further, wireless communicator 101 receives audio information including voice of resident 30 from monitor device 200. Accordingly, outdoor visitor 20 and indoor resident 30 can talk to each other.

Controller 102 includes, for example, a read only memory (ROM), a random access memory (RAM), and a central processing unit (CPU). For example, the CPU executes a program held in the ROM to realize various functions of controller 102.

Controller 102 performs various controls, operations, and determinations for entire camera device 100. Controller 102 performs an operation process for controlling each unit of camera device 100.

Power supply 103 supplies power to each unit in order to operate camera device 100. In power supply 103, power may be input from an AC power supply or an AC adapter. Power supply 103 may include a battery such as a primary battery or a secondary battery in consideration of installation.

Capture unit 104 images a predetermined outdoor space. An image captured by capture 104 (captured image) includes, for example, a moving image and a still image, and visitor 20, a passerby, a suspicious person, an object other than a human, and the like are included in the captured image.

Storage unit 105 includes a flash memory or the like, and stores, for example, device information, such as an identification number, and setup information of camera device 100, state information of monitor device 200, and a captured image before transmission to monitor device 200.

Interrupt detector 106 detects key interrupt of a button or the like included in camera device 100, interrupt by a timer, and interrupt by various events. The detection of the interrupt includes detection by hardware and detection by software.

Interrupt detector 106 also has a function of controlling supply of power from power supply 103 to each unit in order to realize ultra-low power consumption. For example, on the circuit, interrupt detector 106 is located between power supply 103 and each unit such as controller 102, and only interrupt detector 106 is operated at all times by the low power of power supply 103. Interrupt detector 106 turns the switching element ON/OFF in order to supply power to each unit based on the detection of a predetermined interrupt.

Configuration of the Monitor Device

Monitor device 200 includes wireless communicator 201, controller 202, power supply 203, display unit 204, storage 205, and interrupt detector 206.

Wireless communicator 201 communicates with camera device 100 via a wireless line. A communication scheme in wireless communicator 201 includes, for example, DECT, a wireless LAN, or Zigbee (registered trademark).

Wireless communicator 201 receives the captured image from camera device 100. Accordingly, indoor resident 30 can visually recognize visitor 20 present in the vicinity of entrance door 10. Further, wireless communicator 201 receives the audio information including voice of visitor 20 from camera device 100. Further, wireless communicator 201 receives the voice of resident 30 using a microphone (not illustrated) of monitor device 200, and transmits the audio information including the voice of resident 30 to camera device 100. Accordingly, outdoor visitor 20 and indoor resident 30 can talk to each other. Controller 202 includes, for example, ROM, RAM, and a CPU. For example, the CPU executes a program held in the ROM to realize various functions of controller 202.

Controller 202 performs various controls, operations, and determinations for entire monitor device 200. Controller 202 performs an operation process for controlling each unit of monitor device 200.

Power supply 203 supplies power to each unit in order to operate monitor device 200. In power supply 203, power may be input from an AC power supply or an AC adapter. Power supply 203 may include a battery such as a primary battery or a secondary battery in consideration of installation.

The display unit 204 includes, for example, a liquid crystal display (LCD), and displays various images. The image includes, for example, a moving image and a still image, and includes the captured image from camera device 100, and an image for operating monitor device 200.

Storage unit 205 includes a flash memory or the like, and stores various images, voices, or other management information. The image includes, for example, a moving image, and a still image, and includes a captured image from camera device 100, and an image for operating monitor device 200. The voice includes, for example, voice of a fixed message generated from monitor device 200.

The other management information includes, for example, password information for preventing various setup information of monitor device 200 from being forcibly changed.

Interrupt detector 206 detects key interrupt of a button or the like included in monitor device 200, interrupt by a timer, and interrupt by various events. The detection of the interrupt includes detection by hardware and detection by software.

Interrupt detector 206 also has a function of controlling supply of power from power supply 203 to each unit in order to realize ultra-low power consumption. For example, on the circuit, interrupt detector 206 is located between power supply 203 and each unit such as controller 202, and only interrupt detector 206 is operated at all times by low power of power supply 203. Interrupt detector 206 turns the switching element ON/OFF in order to supply power to each unit based on the detection of a predetermined interrupt.

Figure 3:
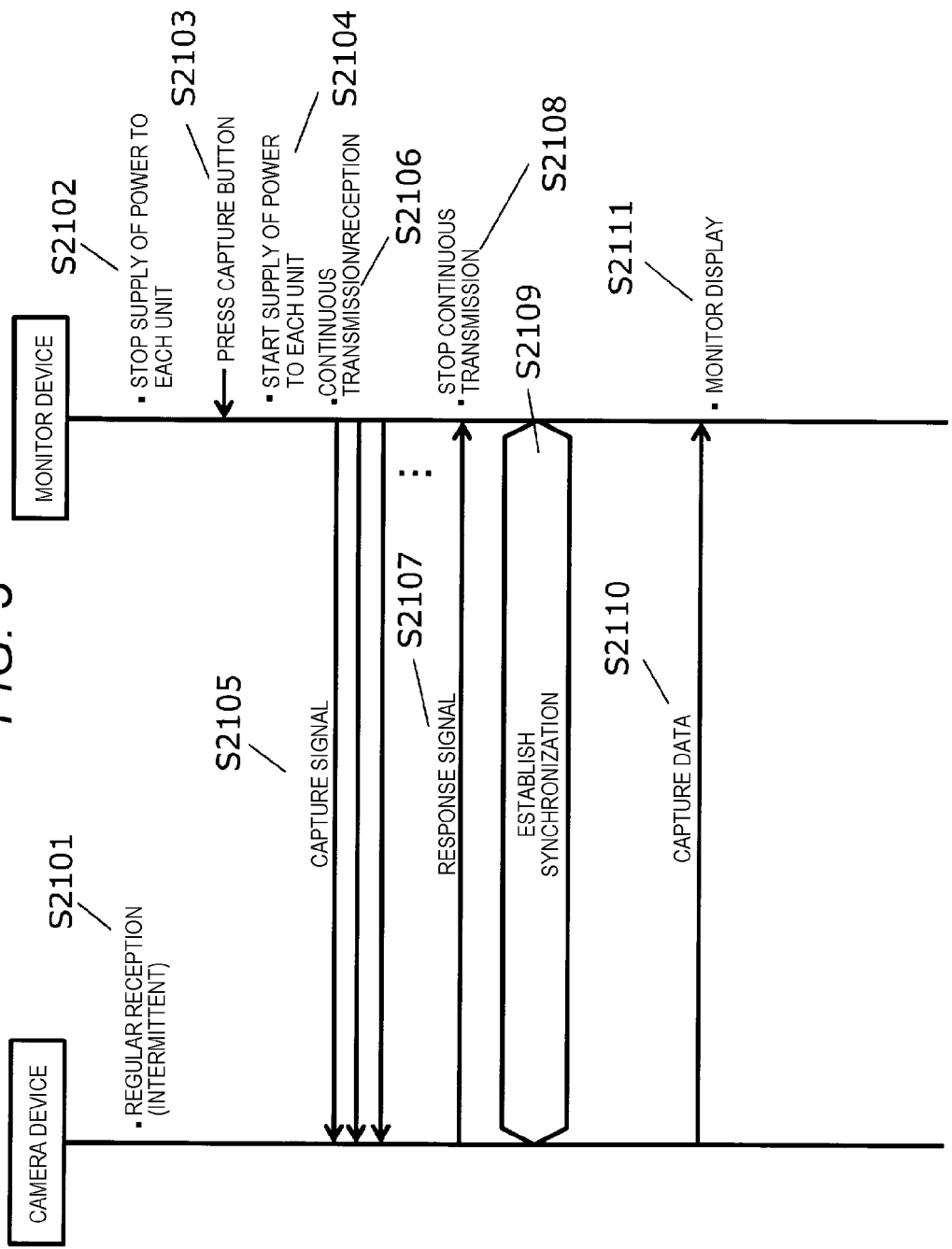
FIG. 3 is a sequence diagram illustrating an overview of an operation of the wireless communication system in the first exemplary embodiment.

FIG. 3 is a sequence diagram illustrating an overview of an operation of wireless communication system 1000 in the first exemplary embodiment. An operation of an example of realization of ultra-low power consumption and a request for a captured image according to this sequence will be described with appropriate reference to FIG. 2.

Realization of Ultra-Low Power Consumption

In wireless communication system 1000 of this exemplary embodiment, the most characteristic point is that camera device 100 and monitor device 200 stop the supply of power from power supply 103 and power supply 203 to the respective units for a predetermined period of time.

Camera device 100 performs regular reception (intermittent reception) (S2101). For example, interrupt detector 106 described with reference to FIG. 2 turns ON the switching element for supply of power from power supply 103 to each unit when the interrupt has occurred due to the timer at predetermined intervals (for example, 2.56 seconds). Wireless communicator 101 to which the power has been supplied performs a reception operation and, accordingly, camera device 100 performs regular reception.

On the other hand, monitor device 200 also stops the supply of power from power supply 203 to each unit while camera device 100 is performing the regular reception (S2102). In monitor device 200, the switching element for supplying of power from power supply 203 to each unit illustrated in, for example, FIG. 2 is turned OFF.

Sequence in Example of a Request for Captured Image

When a capture button (not illustrated) is pressed in monitor device 200 (S2103), supply of power from power supply 203 to each unit is started (S2104). For example, interrupt detector 206 described with reference to FIG. 2 detects the key interrupt caused by pressing of the capture button, and turns ON the switching element for supply of power from power supply 203 to each unit.

Wireless communicator 201 to which the power has been supplied transmits a capture signal for performing a synchronization process with camera device 100 (S2105). In this case, wireless communicator 201 continuously transmits the capture signal at predetermined intervals (for example, 2.56 seconds) of the regular reception of camera device 100, and performs reception of the response signal (S2106). Details of the operation of the continuous transmission and reception will be described below.

In camera device 100, wireless communicator 101 receives the capture signal through the regular reception, and transmits a response signal as a response to monitor device 200 (S2107). Wireless communicator 101 starts the synchronization process based on synchronization information included in the capture signal under the control of controller 102.

On the other hand, in monitor device 200, when wireless communicator 201 receives the response signal from camera device 100, monitor device 200 stops the continuous transmission of the capture signal (S2108), and starts the synchronization process.

When synchronization is established between camera device 100 and monitor device 200 (S2109), camera device 100 transmits captured data (captured image) captured by capture 104 to monitor device 200 using wireless communicator 101 (S2110).

In this case, the captured data that camera device 100 transmits to monitor device 200 may be captured data captured by capture 104 in response to the reception of the capture signal, or captured data read from storage 105 that stores the captured data that has been captured in advance.

For example, if interrupt detector 106 supplies power to each unit even when interrupt detector 106 detects an interrupt from the human sensor or the like, imaging in capture 104 and storage of the captured data in storage 105 become possible when the sensor reacts. Accordingly, it is possible to image a suspicious person or the like while performing a power saving operation.

When wireless communicator 201 receives the captured data from camera device 100, monitor device 200 displays the images sent as captured data on the display unit 204 (S2111).

As described above, camera device 100 and monitor device 200 completely stop the supply of power from power supply 103 and power supply 203 to each unit for a predetermined period of time. Moreover, since the supply of power to each unit is performed in response to the interrupt by interrupt detector 106 and interrupt detector 206, ultra-low power consumption can be realized.

In particular, when camera device 100 is performing the regular reception (that is, camera device 100 can perform transmission to monitor device 200), monitor device 200 that is a master device does not normally stop the supply of power to each unit (that is, does not enter a state that monitor device 200 cannot perform reception), but since monitor device 200 can operate without problem even when the supply of power to each unit is stopped by the above-described configuration, ultra-low power consumption can be realized, unlike the related art.

Operation of Continuous Transmission and Reception

Hereinafter, details of a continuous transmission and reception operation in monitor device 200 described in step S2106 of FIG. 3 will be described while showing transmission and reception timings of signals between monitor device 200 and camera device 100. FIG. 3 will be appropriately referred to.

Figure 4:
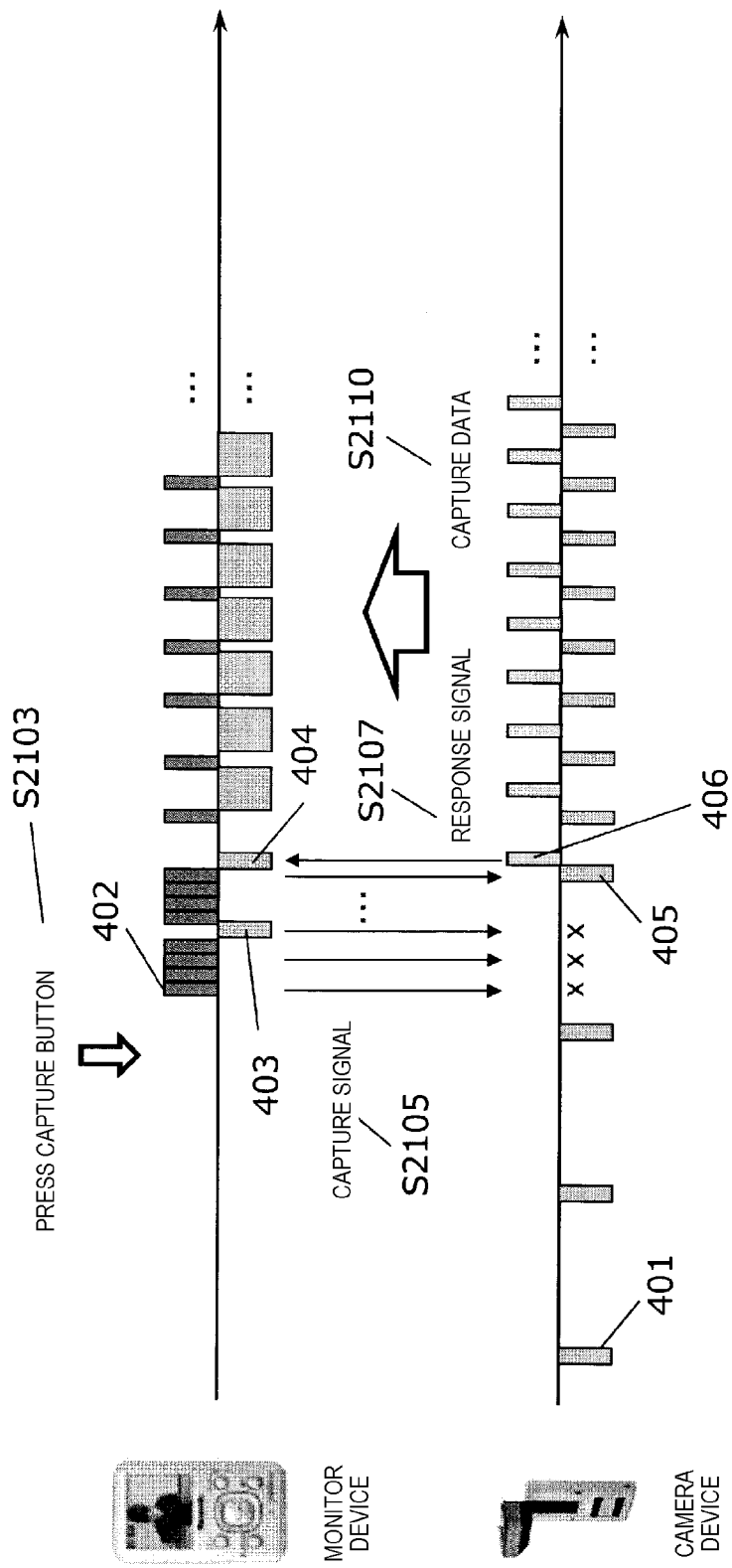
FIG. 4 is a diagram illustrating signal transmission and reception between a camera device and a monitor device when a capture button is pressed in the first exemplary embodiment.

FIG. 4 is a diagram illustrating signal transmission and reception between camera device 100 and monitor device 200 when the capture button is pressed in the first exemplary embodiment. As illustrated in FIG. 4, when camera device 100 performs the regular reception described in step S2101, reception period 401 of a predetermined time S (for example, 0.8 milliseconds) is set at predetermined time intervals T (for example, 2.56 seconds).

When the capture button described in step S2103 is pressed, monitor device 200 transmits the capture signal described in step S2105 in a period continuous from transmission period 402. A mark x of an arrival destination of the capture signal on camera device 100 side in FIG. 4 indicates that the capture signal cannot be received at the timing of the regular reception at predetermined time intervals T after reception period 401 of camera device 100.

Monitor device 200 sets a period in which monitor device 200 continuously transmits the capture signal to be equal to the time interval T of the regular reception described above, or sets the period to be longer than the time interval T so that the capture signal is reliably received by camera device 100. However, when the period in which monitor device 200 continuously transmits the capture signal is long, power consumption increases. Accordingly, for example, several reception periods 403 and 404 are provided in the continuous transmission.

For example, monitor device 200 stops the continuous transmission if monitor device 200 does not receive the response signal described in step S2107 in reception period 403, and continues the continuous transmission if monitor device 200 does not receive the response signal, and performs the same determination in the next reception period 404. FIG. 4 illustrates an example in which the capture signal is received in reception period 405 of the regular reception of camera device 100, and the response signal transmitted in a subsequent transmission period 406 is received in reception period 404 described above.

Thus, in monitor device 200, by providing several reception periods within the continuous transmission of the capture signal, unnecessary continuous transmission after a timing at which monitor device 200 can receive the response signal is suppressed and power saving is achieved.

Then, as described with reference to FIG. 3, the synchronization is established between camera device 100 and monitor device 200, and the captured data described in step S2110 is transmitted from camera device 100 to monitor device 200 at a synchronized timing of transmission and reception.

As described above, according to wireless communication system 1000, it is possible to provide a period in which the power is not supplied to each unit until next reception of the regular reception in camera device 100 and until pressing of the capture button is detected in monitor device 200. Thus, it is possible to greatly reduce power consumption of camera device 100 (wireless slave device) and monitor device 200 (wireless master device).

Further, according to wireless communication system 1000, if monitor device 200 receives the response signal from camera device 100 when continuously transmitting the capture signal, monitor device 200 can stop the continuous transmission and perform the synchronization process with camera device 100. Thus, it is possible to further reduce the power consumption of monitor device 200 (wireless master device).

Second Exemplary Embodiment

In a second exemplary embodiment, an example of a configuration and an example of an operation of wireless communication system 1000 in which it can be confirmed that the other side is under an operation of the ultra-low power consumption in an example of the most basic operation of wireless communication system 1000 shown in the first exemplary embodiment, that is, an example of the operation of the ultra-low power consumption in which camera device 100 and monitor device 200 stop the supply of the power from power supply 103 and power supply 203 to each unit for a predetermined period of time will be described.

State Display Unit

Figure 5:
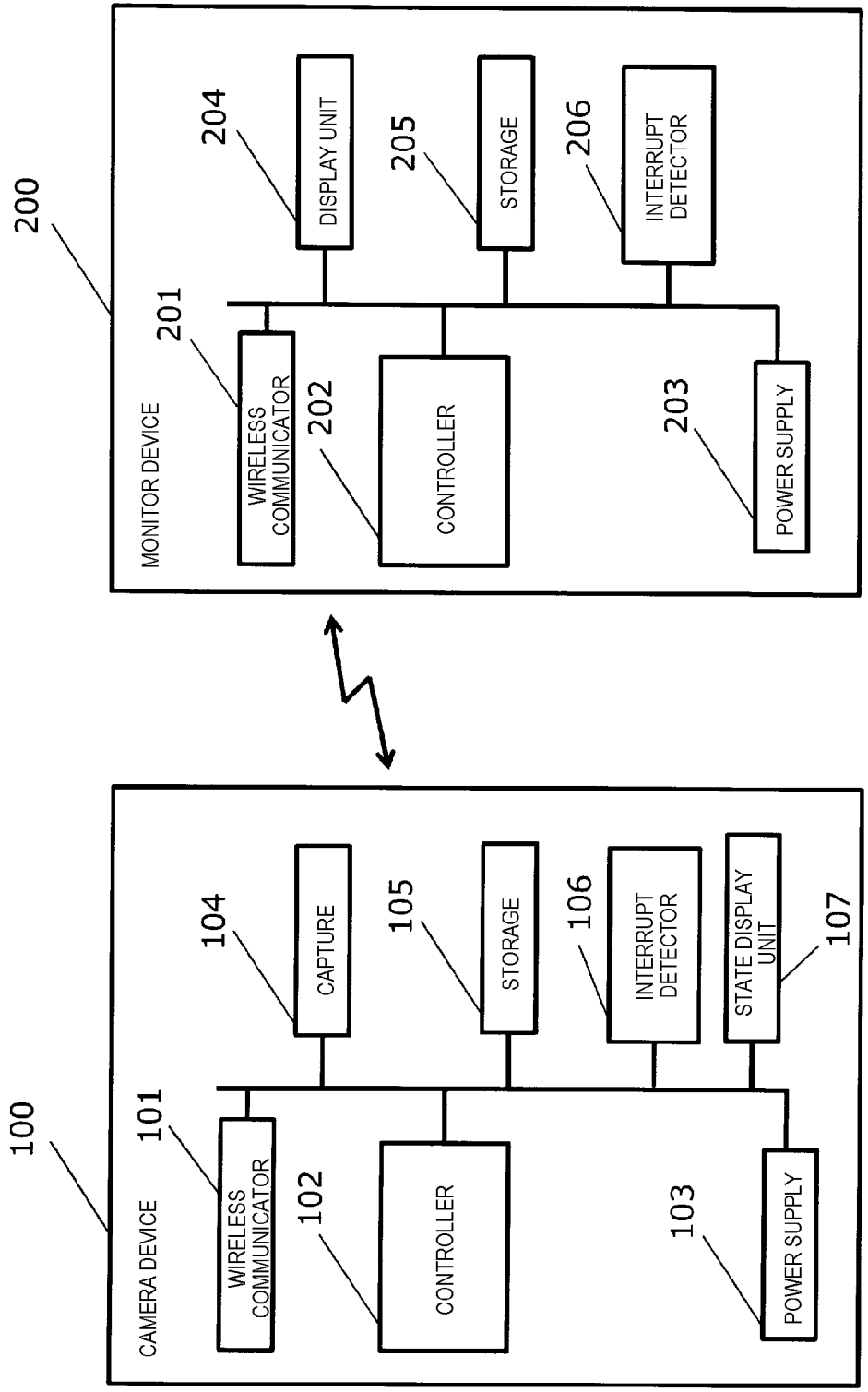
FIG. 5 is a block diagram illustrating an example of a configuration of a wireless communication system in a second exemplary embodiment.

FIG. 5 is a block diagram illustrating an example of a configuration of wireless communication system 1000 according to the second exemplary embodiment. FIG. 5 differs from FIG. 2 in that a state display unit 107 is provided in camera device 100.

State display unit 107 is, for example, a display unit configured of a light emitting diode (LED) or the like, and displays state information of monitor device 200. The state information is intended to distinguish during a power saving monitor mode and during a normal monitor mode which will be described below from each other. The status information is displayed using green or red color or on/off/blinking of the LED in distinction from each other.

From the display of state display unit 107, resident 30 can confirm the state information of monitor device 200 from camera device 100.

Since a configuration other than state display unit 107 of camera device 100 and a configuration of monitor device 200 are described with reference to FIG. 2, a repeated description thereof will be omitted.

Transition of State

Figure 6:
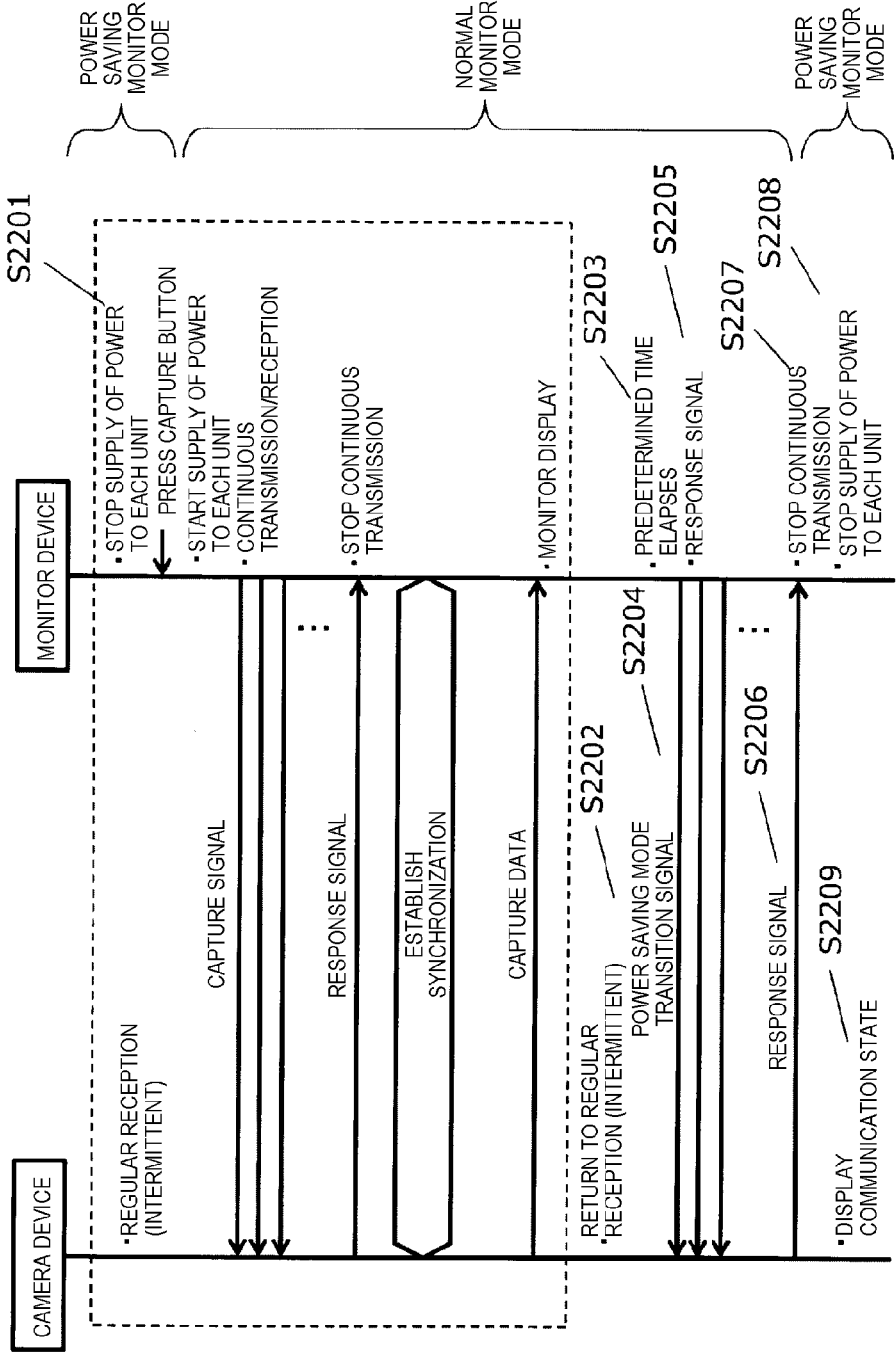
FIG. 6 is a sequence diagram illustrating an overview of an operation of the wireless communication system in the second exemplary embodiment.

FIG. 6 is a sequence diagram illustrating an overview of an operation of wireless communication system 1000 in the second exemplary embodiment. A state display operation of state display unit 107 will be described according to this sequence. Description will be given with appropriate reference to FIG. 3.

In FIG. 6, a sequence of step S2201 surrounded by a rectangular dotted line is exactly the same as steps S2101 to S2111 in FIG. 3. Here, a state during stop of supply of power to each unit shown in step S2102 is referred to as a "power saving monitor mode," and a state from start of supply of power to each unit shown in step S2102 to re-transition to "power saving monitor mode" to be described below is referred to as a "normal monitor mode".

Camera device 100 that has transmitted the captured data in the sequence of step S2201 in FIG. 6 returns to the regular reception operation before the capture signal reception in order to reduce power consumption. That is, when interrupt detector 106 supplies power from power supply 103 to each unit when the interrupt occurs due to a timer of a predetermined interval, and the wireless communicator 101 to which the power has been supplied returns to the state in which the wireless communicator 101 is performing the reception operation (S2202).

On the other hand, monitor device 200 that has displayed the captured data in the sequence of step S2201 waits for a predetermined time to elapse (S2203), and similarly starts the transition from the "normal monitor mode" to the "power saving monitor mode". The predetermined time is time in which monitor device 200 is likely to receive information from camera device 100, and may vary according to a setting.

Notification for State Display

In wireless communication system 1000 of this exemplary embodiment, the most characteristic point is that monitor device 200 notifies camera device 100 of an indication indicating transition to a "power saving monitor mode" in advance.

When monitor device 200 transitions to the "power saving monitor mode", monitor device 200 does not perform the reception operation, and thus, monitor device 200 does not receive a transmission signal from camera device 100 at all. When camera device 100 transmits, for example, captured data without recognizing a state of monitor device 200, there is a problem in that the captured data is discarded. Therefore, in wireless communication system 1000, monitor device 200 notifies camera device 100 of an indication that monitor device 200 transitions to the "power saving monitor mode" in advance.

Monitor device 200 transmits a power saving mode transition signal as a notification of an indication indicating transition of monitor device 200 to the "power saving monitor mode" using wireless communicator 201 (S2204). Here, the power saving mode transition signal need not be a special signal, and may be any signal capable of notifying the above-described indication indicating transition.

In this case, since camera device 100 returns to the regular reception, monitor device 200, continuously transmits the power saving mode transition signal, performs reception of a response signal (S2205), receives the response signal (S2206), and stops the continuous transmission (S2207), as in steps S2106 to S2018 in FIG. 3.

When monitor device 200 stops the continuous transmission of the power saving mode transition signal of step S2207, monitor device 200 stops power supply from power supply 203 to each unit (S2208). For example, monitor device 200 turns off the switching element for supply of power from power supply 203 to each unit illustrated in FIG. 2.

When camera device 100 receives the power saving mode transition signal continuously transmitted in steps S2204 and S2205, camera device 100 transmits the response signal of step S2206, and displays the state information ("during power saving monitor mode") of monitor device 200 on state display unit 107 (S2209). Further, camera device 100 stores the state information of monitor device 200 in storage 105.

Since the state information of monitor device 200 is stored in storage 105, it is possible to determine that camera device 100 does not directly transmit the captured data to monitor device 200 (accumulates the captured data in storage 105) by referring to the state information of monitor device 200, for example, even in a specification in which camera device 100 captures the captured data and transmits the captured data to monitor device 200 when the human sensor or the like reacts.

Signal Transmission and Reception Timing

Figure 7:
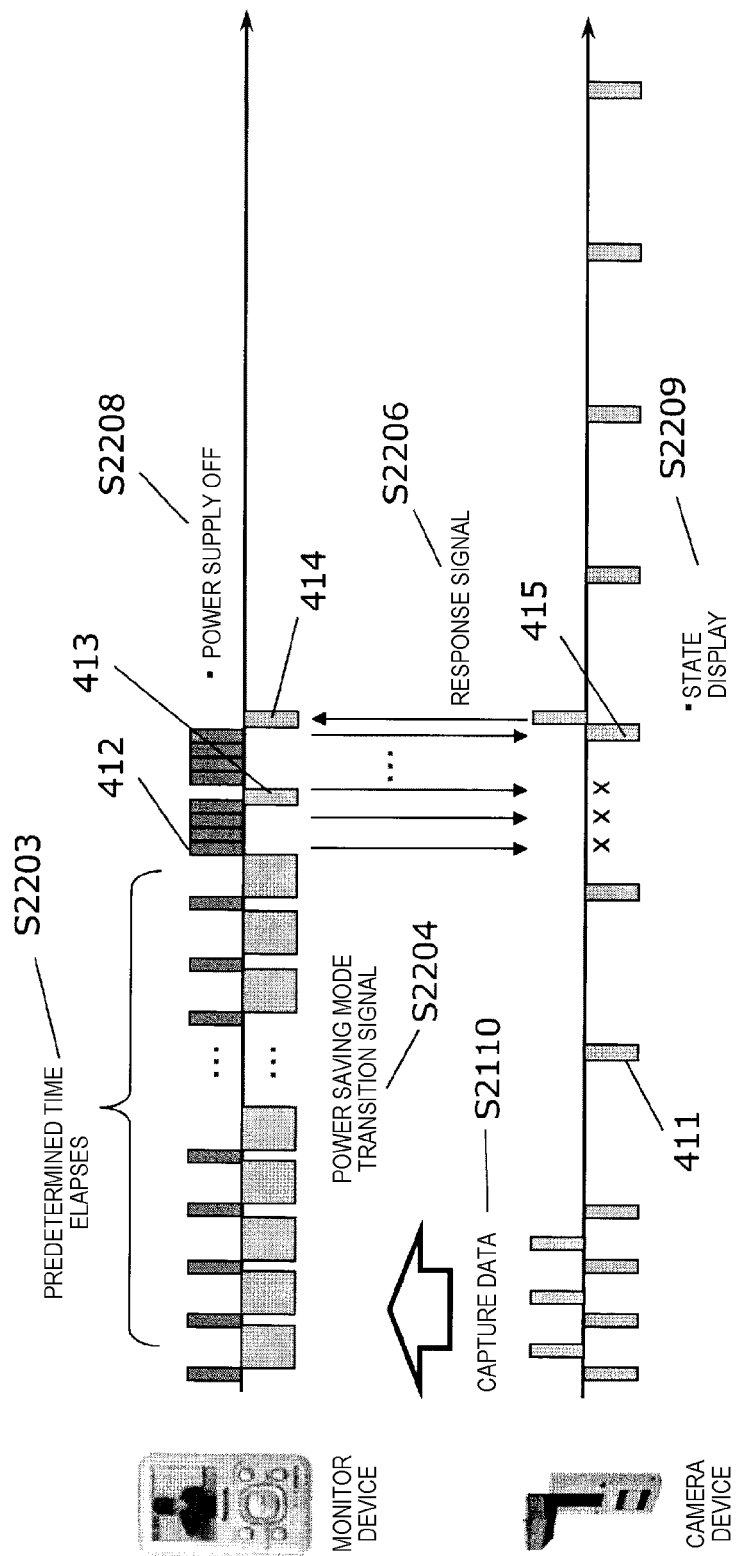
FIG. 7 is a diagram illustrating signal transmission and reception between a camera device and a monitor device when a predetermined time elapses in the second exemplary embodiment.

FIG. 7 is a diagram illustrating signal transmission and reception between the camera device and the monitor device when a predetermined time elapses in the second exemplary embodiment. FIG. 7 corresponds to the sequence in FIG. 6, and illustrates transmission and reception timings of each signal subsequent to the transmission of the captured data in step S2110 illustrated in FIG. 4. In the following description, repeatedly described portions will be omitted or simplified with appropriate reference to FIGS. 6 and 4.

Camera device 100 that has completed the transmission of the captured data returns to the regular reception at predetermined time intervals T from reception period 411, and then performs the regular reception.

On the other hand, when the predetermined time described in step S2203 of FIG. 6 elapses, monitor device 200 continuously transmits the power saving mode transition signal described in step S2203 from transmission period 412. In this case, reception period 413 is provided for the same reason as that described with reference to FIG. 4.

When monitor device 200 receives the response signal described in step S2206 in reception period 414, monitor device 200 stops the supply of power from power supply 203 to each unit described in step S2208.

When camera device 100 receives the power saving mode transition signal in reception period 415, camera device 100 transmits a response signal and displays the state information of monitor device 200 on state display unit 107 described in step S2209.

As described above, according to wireless communication system 1000, camera device 100 returns to a state in which the power is not supplied to each unit until the next reception of the regular reception, and monitor device 200 returns to the state of the "power saving monitor mode" in which the power is not supplied to each unit until pressing of the capture button is detected. Accordingly, it is possible to greatly reduce power consumption of camera device 100 (wireless slave device) and monitor device 200 (wireless master device).

Further, when monitor device 200 returns to the state of the "power saving monitor mode", camera device 100 is notified of the indication indicating transition. Accordingly, camera device 100 can transmit the information obtained by each interrupt without discarding the information when monitor device 200 enters the state of the "normal monitor mode".

Further, since camera device 100 displays the state information of monitor device 200 on state display unit 107, resident 30 can confirm the state information of monitor device 200 from camera device 100 at a glance.

Third Exemplary Embodiment

The transition of monitor device 200 to the "power saving monitor mode" shown in the second exemplary embodiment is started after monitor device 200 waits for the predetermined time to elapse. In a third exemplary embodiment, an example of an operation in which the transition is started by an explicit operation such as (detection of) pressing of the power saving button will be described.

Further, an example of an operation in which transition to the "normal monitor mode" of monitor device 200 is started by (detection of) pressing of the capture button or started by (detection of) pressing of the power saving release button will be described.

In the third exemplary embodiment, an example of a configuration of wireless communication system 1000 is the same as the block diagram of FIG. 5 described in the second exemplary embodiment. Therefore, description of the example of the configuration will be omitted.

Transition State

Figure 8:
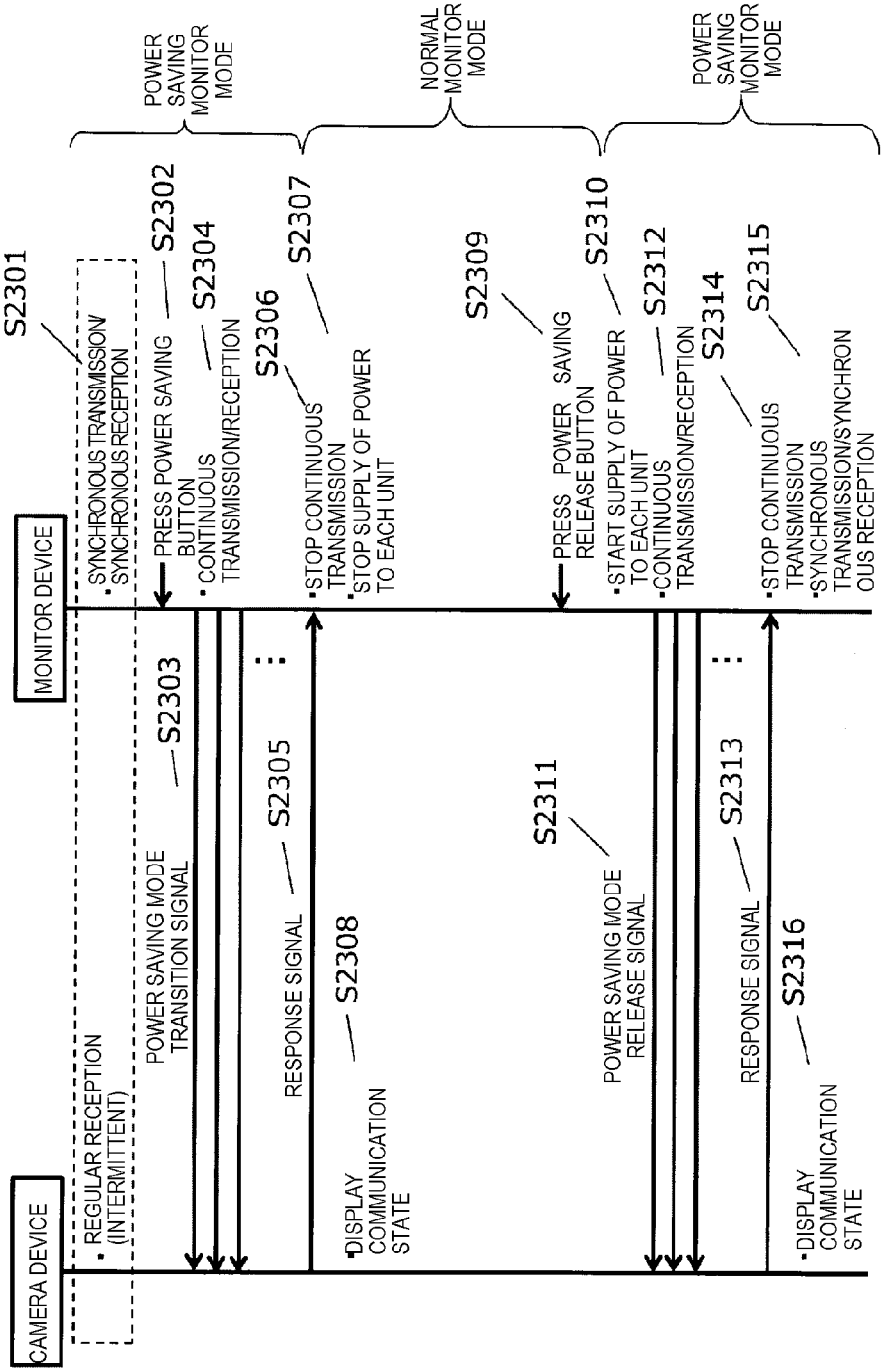
FIG. 8 is sequence diagram illustrating an overview of an operation of a wireless communication system in a third exemplary embodiment.

FIG. 8 is a sequence diagram illustrating an overview of an operation of wireless communication system 1000 in a third exemplary embodiment. Description will be given according to this sequence. Description will be given with appropriate reference to FIG. 6.

In FIG. 8, a sequence of step S2301 surrounded by a rectangular dotted line is subsequent to step S2202 in FIG. 6. In this state, camera device 100 transitions to the regular reception, but monitor device 200 operates in the "normal monitor mode" in which synchronous transmission/synchronization reception to/from camera device 100 is possible.

Sequence in Example of Mode Transition Due to Pressing of Power Saving Button

In wireless communication system 1000 of this exemplary embodiment, the most characteristic point is that monitor device 200 in a state of the "normal monitor mode" can forcibly transition to the "power saving monitor mode".

When monitor device 200 is in the state of the "normal monitor mode", monitor device 200 remains in that state or waits for a predetermined time in order to receive transmission from camera device 100, and then transitions to "power saving monitor mode". However, in this case, since the power is supplied to each unit of monitor device 200, the power is consumed.

Therefore, monitor device 200 can transition to the "power saving monitor mode" without waiting for a predetermined time.

When a power saving button (not illustrated) is pressed in monitor device 200 operating in the "normal monitor mode" (S2302), interrupt detector 206 described in, for example, FIG. 2 detects a key interrupt caused by pressing of the power saving button.

Wireless communicator 201 transmits a power saving mode transition signal that is a notification of the indication indicating the transition to the "power saving monitor mode" under the control of controller 202 that has received a detection result of the key interrupt (S2303). Here, while the power saving mode transition signal is the same power saving mode transition signal as in FIG. 6, the power saving mode transition signals may be separately distinguished.

Then, as in steps S2205 to S2208 of FIG. 6, the monitor device continuously transmits the power saving mode transition signal (S2304), performs reception of a response signal (S2305), receives the response signal to stop the continuous transmission (S2306), and stops the supply of power from power supply 203 to each unit (S2307) to complete transition to the "power saving monitor mode".

On the other hand, when camera device 100 receives the power saving mode transition signal continuously transmitted in steps S2303 and S2304, camera device 100 transmits a response signal of step S2205, and displays the state information ("during power saving monitor mode") of monitor device 200 on state display unit 107 (S2308). Further, the state information of monitor device 200 is stored in storage 105.

Sequence when Power Saving Release Button is Pressed

In wireless communication system 1000 of this exemplary embodiment, another characteristic point is that monitor device 200 in a state of "power saving monitor mode" can forcibly transition to the "normal monitor mode".

When monitor device 200 is in the state of the "power saving monitor mode", a transmission signal from camera device 100 is not received at all. If the transition to the "normal monitor mode" can be performed only by pressing of the capture button even when camera device 100 can recognize the state of monitor device 200, there is a problem, for example, when resident 30 desires to transmit information to camera device 100 in real time.

Accordingly, in monitor device 200, transition to the "normal monitor mode" can be performed by a manner other than (detection of) pressing of the capture button.

In monitor device 200 operating in the "power saving monitor mode", when a power saving release button (not illustrated) is pressed (S2309), the supply of power from power supply 203 to each unit is started (S2310). For example, interrupt detector 206 described with reference to FIG. 2 detects the key interrupt caused by pressing of the power saving release button, and turns ON the switching element for supply of power from power supply 203 to each unit.

Wireless communicator 201 to which the power has been supplied transmits a power saving mode release signal that is a notification of the indication indicating the transition to the "normal monitor mode" using wireless communicator 201 (S2311). Here, the power saving mode release signal need not be a special signal, and may be any signal capable of performing the notification of the indication indicating the transition described above.

Then, as in steps S2304 to S2308, monitor device 200 continuously transmits the power saving mode release signal (S2312), performs reception of the response signal (S2313), receives the response signal to stop the continuous transmission (S2314), and transitions to the "normal monitor mode" in which synchronous transmission/synchronization reception to and from camera device 100 is possible (S2315).

Monitor device 200 may store information indicating whether the transition to "normal monitor mode" is caused by pressing of the capture button or caused by the pressing of the power saving release button in storage 205. After the transition to the "normal monitor mode," for example, a process of determining whether monitor device 200 is caused to transition to the "power saving monitor mode" or monitor device 200 is not caused to transition to the "power saving monitor mode" after waiting for a predetermined time.

The information indicating whether the transition to "normal monitor mode" is caused by pressing of the capture button or caused by the pressing of the power saving release button described above may be included in the power saving mode transition signal.

On the other hand, when camera device 100 receives the power saving mode release signal continuously transmitted in steps S2311 and S2312, camera device 100 transmits the response signal of step S2313, and displays the state information ("during normal monitor mode") of monitor device 200 on state display unit 107 (S2316). Further, camera device 100 stores the state information of monitor device 200 in storage 105.

Since the display on state display unit 107 can be performed, for example, using green or red color or on/off/blinking by the LED in distinction from each other, state information resulting from pressing of the power saving button/power saving release button may be displayed in distinction from a case of state transition resulting from elapse of a predetermined time.

Signal Transmission and Reception Timing

Figure 9:
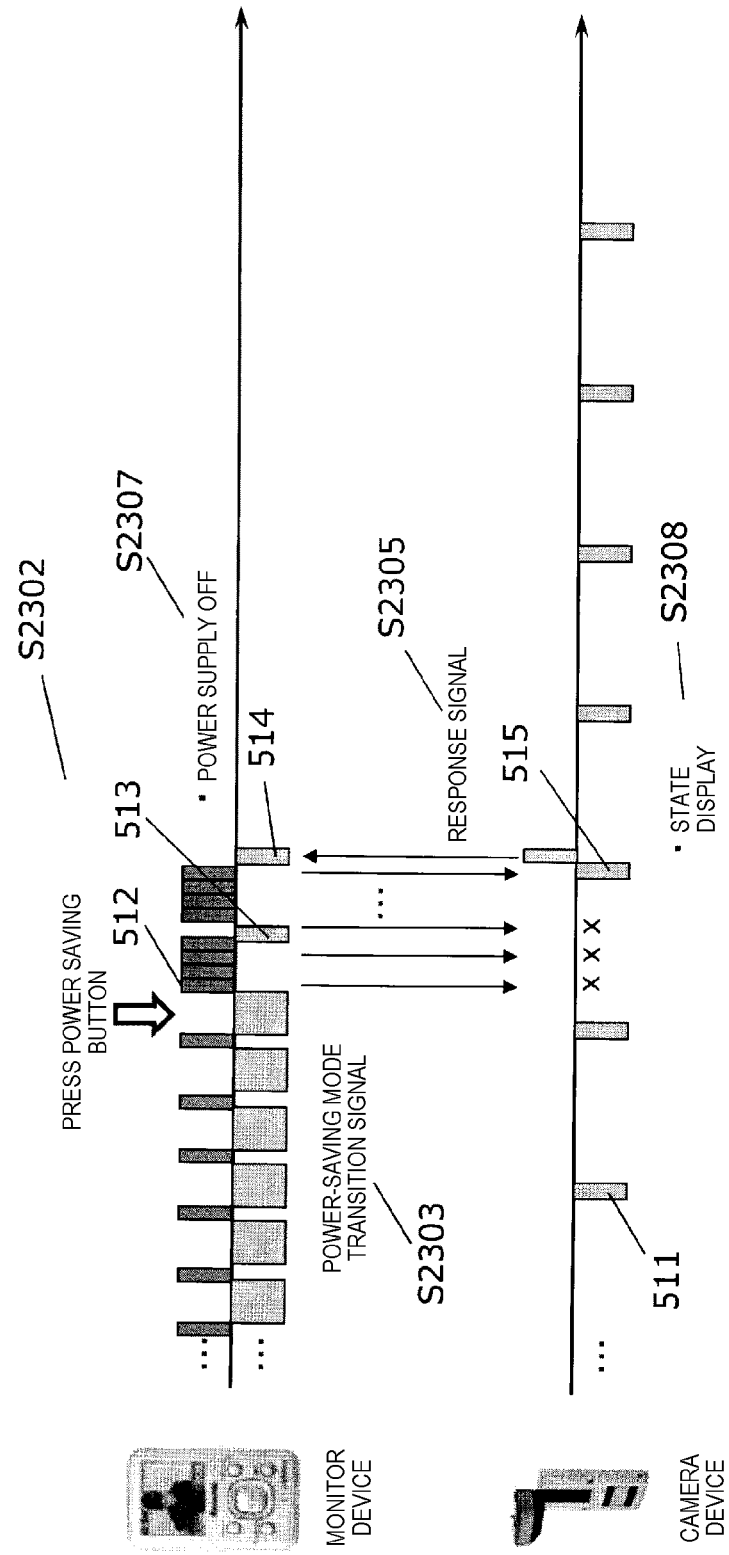
FIG. 9 is a diagram illustrating signal transmission and reception between a camera device and a monitor device when a power saving button is pressed in the third exemplary embodiment.
Figure 10:
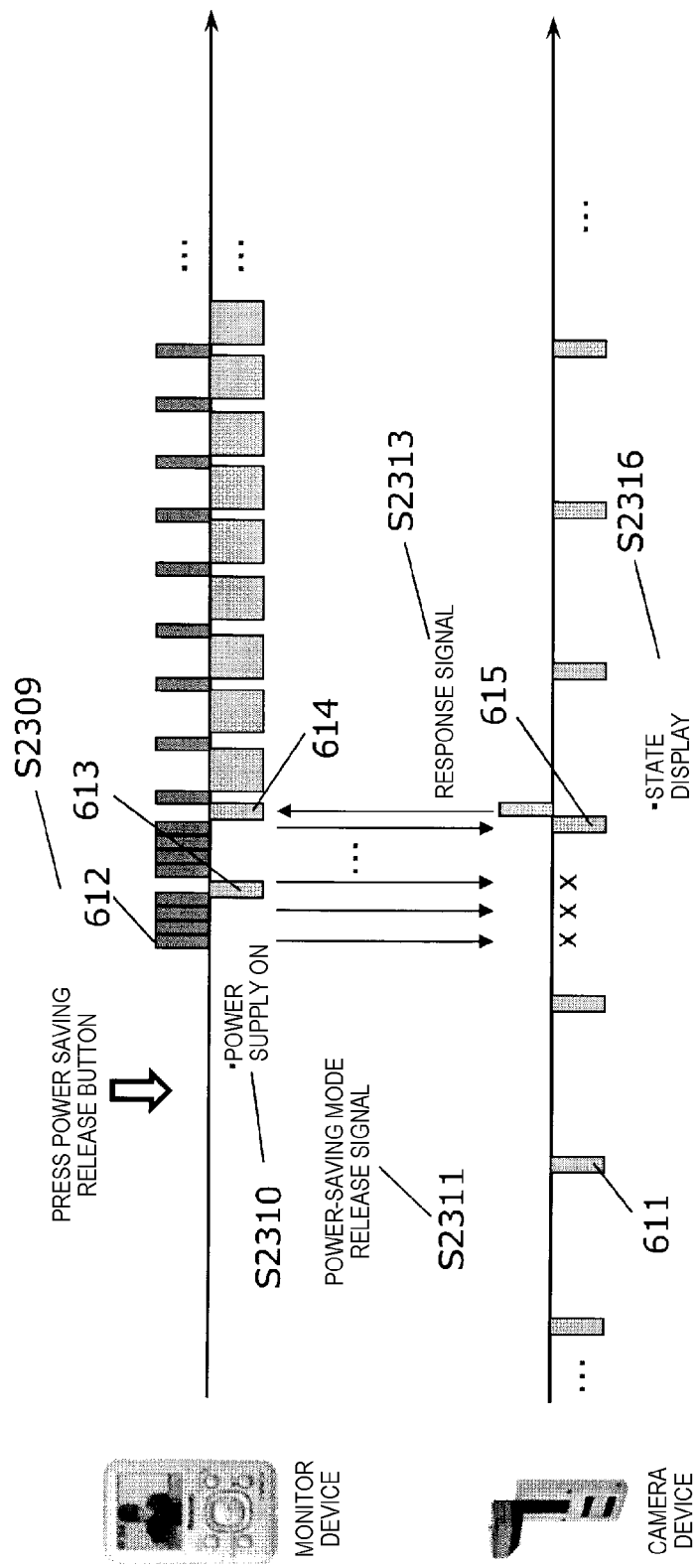
FIG. 10 is a diagram illustrating signal transmission and reception between the camera device and the monitor device when a power saving release button is pressed in the third exemplary embodiment.

FIG. 9 is a diagram illustrating signal transmission and reception between camera device 100 and monitor device 200 when the power saving button is pressed in the third exemplary embodiment. FIG. 10 is a diagram illustrating signal transmission and reception between camera device 100 and monitor device 200 when the power saving release button is pressed in the third exemplary embodiment. FIGS. 9 and 10 illustrate transmission and reception timings of each signal corresponding to the sequence of FIG. 8. In the following description, repeatedly described portions will be omitted or simplified with appropriate reference to FIG. 8.

In FIG. 9, when camera device 100 performs regular reception at predetermined time intervals T as indicated by reception period 511, if there is pressing of the power saving button described in step S2302 of FIG. 8 in monitor device 200 during the normal monitor mode, monitor device 200 continuously transmits the power saving mode transition signal described in step S2303 from transmission period 512. In this case, reception period 513 is provided for the same reason as that illustrated in FIG. 8.

When monitor device 200 receives a response signal described in step S2305 in reception period 514, monitor device 200 stops the supply of power from power supply 203 to each unit described in step S2307.

When camera device 100 receives the power saving mode transition signal in reception period 515, camera device 100 transmits a response signal, and displays the state information of monitor device 200 on state display unit 107 described in step S2308.

Then, in FIG. 10, when camera device 100 performs regular reception at predetermined time intervals T as shown in reception period 611, if there is pressing of the power saving release button described in step S2309 of FIG. 8 in monitor device 200 during the power saving monitor mode, power supply from power supply 203 to each unit described in step S2310 starts.

Wireless communicator 201 to which the power has been supplied continuously transmits the power saving mode release signal described in step S2311 from transmission period 612. In this case, reception period 613 is provided for the same reason as described above.

When monitor device 200 receives the response signal described in step S2313 in reception period 614, monitor device 200 performs synchronous transmission/synchronization reception described in step S2315.

On the other hand, when camera device 100 receives the power saving mode release signal in reception period 615, camera device 100 transmits a response signal, and displays the state information of monitor device 200 on state display unit 107 described in step S2316.

As described above, according to wireless communication system 1000, since monitor device 200 in a state of the "normal monitor mode" can forcibly transition to the "power saving monitor mode", it is possible to further reduce power consumption of monitor device 200 as compared to a case in which monitor device 200 waits for a predetermined time and then transitions to the "power saving monitor mode". Thus, it is possible to greatly reduce power consumption of camera device 100 (wireless slave device) and monitor device 200 (wireless master device).

Further, since monitor device 200 in the "power saving monitor mode" state can forcibly transition to the "normal monitor mode", it is possible to cope with, for example, a case in which camera device 100 desires to capture information when the human sensor or the like reacts, and transmit the information to monitor device 200 in real time.

Further, since camera device 100 displays the state information of monitor device 200 on state display unit 107, resident 30 can confirm the state information of monitor device 200 from camera device 100 at a glance.

Fourth Exemplary Embodiment

In a fourth exemplary embodiment, an example of an operation that camera device 100 shown in the second exemplary embodiment can perform in each mode of monitor device 200 will be described.

In the fourth exemplary embodiment, an example of a configuration of wireless communication system 1000 is the same as in a block diagram of FIG. 5 described in the second exemplary embodiment. Therefore, description of the example of a configuration will be omitted.

Example of Operation of Camera Device 100 in "Normal Monitor Mode"

Figure 11:
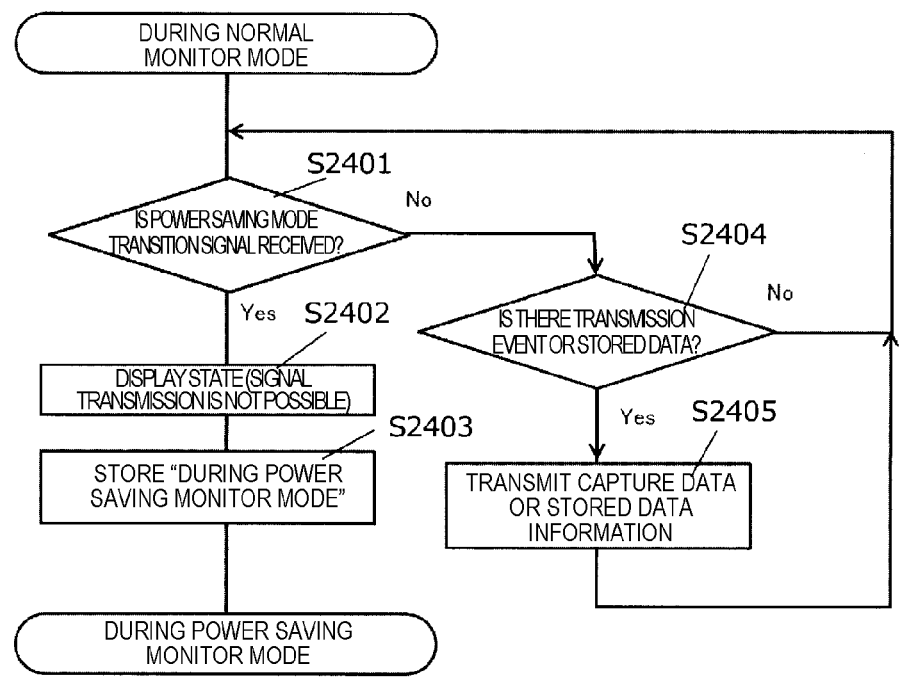
FIG. 11 is a flowchart illustrating an operation during a normal monitor mode of a camera device in a fourth exemplary embodiment.

FIG. 11 is a flowchart illustrating an operation during the normal monitor mode of camera device 100 in the fourth exemplary embodiment. Description will be given with reference to this flowchart.

In FIG. 11, camera device 100 determines whether camera device 100 has received a power saving mode transition signal from monitor device 200 in a "normal monitor mode" state (S2401). When camera device 100 receives the power saving mode transition signal (S2401: Yes), camera device 100 displays state information ("during power saving monitor mode") of monitor device 200 on state display unit 107 (S2402).

In this case, since camera device 100 enters a state in which signal transmission to monitor device 200 is not possible, a display indicating that the signal transmission is not possible may be performed. For example, when camera device 100 has a text display function of an LCD or the like as state display unit 107 and talks to monitor device 200 using a call button (not illustrated), it can be seen that the signal transmission is not possible at a glance.

Camera device 100 that has displayed the state information in step S2402 stores the state information ("during power saving monitor mode") of monitor device 200 in storage 105 (S2403). Camera device 100 transitions to an operation during the power saving monitor mode to be described below.

On the other hand, when camera device 100 does not receive the power saving mode transition signal (S2401: No), camera device 100 determines whether there is a transmission event or the stored data to be transmitted which has been stored in storage 105 (S2404). The transmission event is, for example, an event such as a reaction of a human sensor or the like. In this case, it is necessary to capture information such as captured data using capture 104 and transmit the information to monitor device 200 in real time.

Further, the stored data to be transmitted that has been stored in storage 105 is, for example, information such as the captured data that is captured by capture 104 due to a reaction of a human sensor or the like and then stored in storage 105 instead of being transmitted to monitor device 200.

When there is the above-described event or information in step S2404 (S2404: Yes), camera device 100 transmits the information such as the captured data described above to monitor device 200 since monitor device 200 is in the "normal monitor mode" state and the reception is possible (S2405). Camera device 100 returns to step S2401 and continues to perform the operation during the normal monitor mode.

Camera device 100 that has displayed the state information in step S2402 stores the state information ("during power saving monitor mode") of monitor device 200 in storage 105.

Example of Operation of Camera Device 100 in "Power Saving Monitor Mode"

Figure 12:
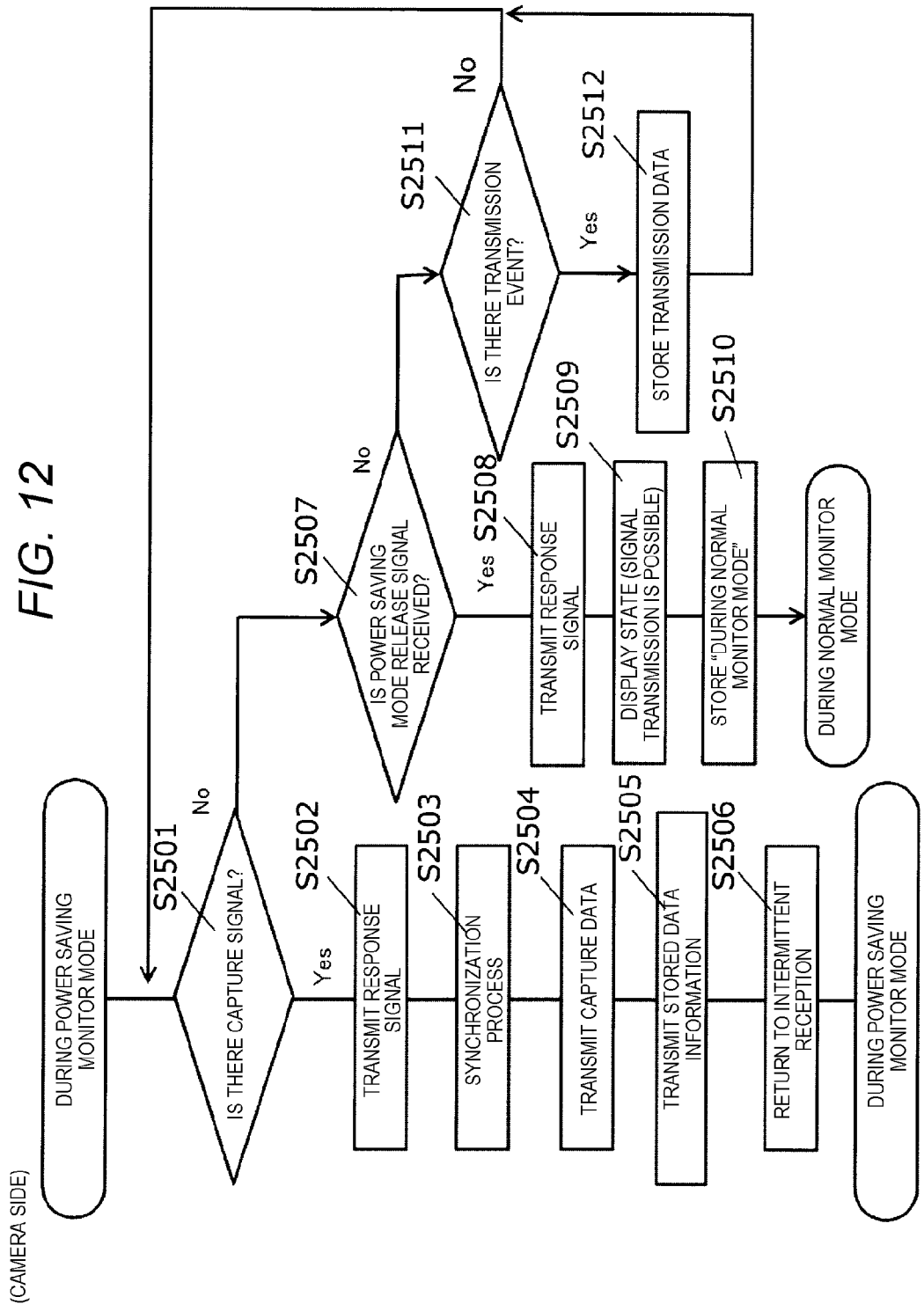
FIG. 12 is a flowchart illustrating an operation during a power saving monitor mode of the camera device in the fourth exemplary embodiment.

FIG. 12 is a flowchart illustrating an operation during a power saving monitor mode of camera device 100 in the fourth exemplary embodiment. Description will be given according to this flowchart.

In FIG. 12, camera device 100 determines whether camera device 100 has received a capture signal from monitor device 200 in a state of the "power saving monitor mode" (S2501). When camera device 100 receives the capture signal (S2501: Yes), camera device 100 transmits a response signal to monitor device 200 (S2502), and performs a synchronization process (S2503).

Camera device 100 transmits information such as captured data captured by capture 104 to monitor device 200. When there is stored data to be transmitted in storage 105 (for example, information such as captured data that is captured by capture 104 when a human sensor or the like reacts, but is not transmitted to monitor device 200 and stored in storage 105), camera device 100 transmits this information to monitor device 200 (S2505).

Camera device 100 that has performed the transmission of the stored data information in step S2505 returns to the intermittent reception (regular reception) (S2506), and continues to perform the operation during the power saving monitor mode.

On the other hand, when camera device 100 does not receive the capture signal in step S2501 (S2501: No), camera device 100 determines whether camera device 100 has received a power saving mode release signal (S2507). When camera device 100 receives the power saving mode release signal (S2507: Yes), camera device 100 transmits a response signal to monitor device 200 (S2508), and displays the state information ("during normal monitor mode") of monitor device 200 on state display unit 107 (S2509).

In this case, since the state in which the signal transmission to monitor device 200 is not possible is changed to a state in which the signal transmission to monitor device 200 is possible, a display indicating that the signal transmission is possible may be performed. For example, when camera device 100 has a text display function of an LCD or the like as state display unit 107 and talks to monitor device 200 using a call button (not illustrated), it can be seen that the signal transmission is possible at a glance.

Camera device 100 that has displayed the state information in step S2509 stores the state information ("during normal monitor mode") of monitor device 200 in storage 105 (S2510). Camera device 100 transitions to the operation during the normal monitor mode.

Further, if camera device 100 does not receive the power saving mode release signal in step S2507 (S2507: No), camera device 100 determines whether the transmission event has occurred (S2511). If there is the transmission event (S2511: Yes), camera device 100 stores transmission data in storage 105 (S2512). If there is no transmission event (S2511: No), camera device 100 remains in the power saving monitor mode.

As described above, according to wireless communication system 1000, since camera device 100 returns to the intermittent reception (regular reception) after necessary transmission is completed, it is possible to reduce the power consumption of camera device 100.

Further, since the state information of monitor device 200 or information indicating that signal transmission is not possible can be displayed on state display unit 107 of camera device 100, resident 30 can recognize whether resident 30 is able to talk to monitor device 200 at a glance, and it is possible to enhance convenience of use of wireless communication system 1000.

Further, since camera device 100 can recognize the state of monitor device 200, camera device 100 can transmit information such as captured data when monitor device 200 is in a receivable state without discarding the information such as captured data when monitor device 200 is not in a receivable state, and it is possible to improve reliability in use of wireless communication system 1000.

Further, since camera device 100 can determine the state of monitor device 200 and transmit the information such as captured data in real time as long as monitor device 200 is in the receivable state, various services can be provided in wireless communication system 1000.

While wireless communication system 1000 including camera device 100 and monitor device 200 has been described in the first to fourth exemplary embodiments, the present invention is not limited thereto, and is also effective in a radio wave remote control, a keyless entry system, or home safety related wireless communication system.

The present invention is useful in a wireless communication system capable of greatly reducing power consumption of a wireless slave device and a wireless master device.

What is claimed is:

1. A wireless communication system comprising a slave device, and a master device wirelessly connected to the slave device,
   wherein the master device includes:
   a master device wireless communicator that performs wireless communication with the slave device;
   a master device power supply that supplies power to the master device;
   a master device interrupt detector that detects one or more interrupts; and
   a master device controller that controls the master device, wherein
   the master device interrupt detector supplies power from the master device power supply to the master device when detecting an interrupt, and
   the master device controller performs control to continuously transmit a capture signal to the slave device, the slave device waiting for reception of a signal from the master device at a predetermined interval, wherein a period in which the capture signal is continuously transmitted from the master device to the slave device is equal to or longer than the predetermined interval.

2. The wireless communication system of claim 1,
   wherein the slave device includes:
   a slave device wireless communicator that performs wireless communication with the master device;
   a slave device power supply that supplies power to the slave device;
   a slave device interrupt detector that detects one or more interrupts; and
   a slave device controller that controls the slave device,
   the slave device interrupt detector supplies the power from the slave device power supply to the slave device when detecting a timer interrupt occurring at predetermined intervals, and
   the slave device controller performs control to wait for reception of the capture signal through the slave device wireless communicator.

3. The wireless communication system of claim 1,
   wherein if the master device controller receives a response signal from the slave device when continuously transmitting the capture signal, the master device controller stops the continuous transmission of the capture signal and performs control to perform synchronization with the slave device.

4. The wireless communication system of claim 1,
   wherein when the master device interrupt detector detects an operation of a power saving key, the master device controller continuously transmits a notification signal indicating a change to a power saving mode to the slave device for a time longer than the predetermined interval, and then, performs control to stop the supply of power to the master device wireless communicator.

5. The wireless communication system of claim 4,
   wherein the master device controller performs control to start the supply of power to the master device wireless communicator and performs control to continuously transmit a notification signal indicating release of the power saving mode for time longer than the predetermined interval to the slave device when the master device interrupt detector has detected an operation of a power saving release key.

6. The wireless communication system of claim 4,
   wherein the slave device further includes a slave device state display that displays a wireless communication state with the master device, and the slave device controller performs control to display an indication indicating that signal transmission is not possible on the slave device state display when receiving a notification signal indicating a change to the power saving mode from the master device.

7. The wireless communication system of claim 4, wherein the slave device further includes:
an image sensor; and
a memory that accumulates the captured data captured by the image sensor, wherein
the slave device controller performs control to accumulate the captured data captured by the image sensor in the memory when the power is not supplied from the master device power supply to the master device wireless communicator in the master device.

8. The wireless communication system of claim 1, wherein the period includes a reception period in which the master device controller waits for a response signal from the slave device and stops the continuous transmission of the capture signal.

9. The wireless communication system of claim 8, wherein when the master device controller does not receive the response signal from the slave device during the reception period, the master device controller restarts the continuous transmission of the capture signal.

10. The wireless communication system of claim 8, wherein when the master device controller receives the response signal from the slave device during the reception period, the master device controller stops the continuous transmission of the capture signal and performs control to perform synchronization with the slave device.

11. The wireless communication system of claim 1, wherein the master device starts to transition from a normal mode to a power saving mode in which a power consumption of the master device is less than a power consumption in the normal mode when a predetermined amount of time elapses from a time of receiving a latest image captured by and transmitted from the slave device.

12. The wireless communication system of claim 11, wherein the master device controller receives a plurality of images captured by and transmitted from the slave device in the normal mode.

13. A wireless communication method in a wireless communication system comprising a slave device, and a master device wirelessly connected to the slave device,
wherein the master device is configured to perform operations including:
performing wireless communication with the slave device;
supplying power to the master device;
detecting one or more interrupts; and
controlling the master device,
supplying power from the master device power supply step to the master device when detecting an interrupt, and
performing control to continuously transmit a capture signal to the slave device, the slave device waiting for reception of a signal from the master device at a predetermined interval, wherein a period in which the capture signal is continuously transmitted from the master device to the slave device is equal to or longer than the predetermined interval.

14. A wireless communication system comprising a slave device, and a master device wirelessly connected to the slave device,
wherein the master device includes:
a master device wireless communicator that performs wireless communication with the slave device;
a master device power supply that supplies power to the master device;
a master device interrupt detector that detects at least one interrupt; and
a master device controller that controls the master device,
the master device interrupt detector supplies power from the master device power supply to the master device when detecting the at least one interrupt, and
the master device controller performs control to continuously transmit a capture signal to the slave device, the slave device awaiting reception of a signal from the master device that is transmitted at predetermined intervals, wherein a duration in which the capture signal is continuously transmitted from the master device to the slave device is equal to or longer than one of the predetermined intervals,
wherein the slave device includes:
a slave device wireless communicator that performs wireless communication with the master device;
a slave device power supply that supplies power to the slave device;
a slave device interrupt detector that detects at least one interrupt; and
a slave device controller that controls the slave device,
the slave device interrupt detector supplies the power from the slave device power supply to the slave device when detecting a timer interrupt occurring at predetermined intervals, and
the slave device controller performs control to wait for reception of the capture signal through the slave device wireless communicator.

* * * * *